US010187292B2

(12) United States Patent
Ghobadi et al.

(10) Patent No.: US 10,187,292 B2
(45) Date of Patent: Jan. 22, 2019

(54) DATA CENTER TOPOLOGY HAVING MULTIPLE CLASSES OF RELIABILITY

(71) Applicant: Microsoft Technology Licensing, LLC, Redmond, WA (US)

(72) Inventors: Monia Ghobadi, Seattle, WA (US); Ratul Mahajan, Seattle, WA (US); Amar Phanishayee, Seattle, WA (US); Danyang Zhuo, Seattle, WA (US); Xuan Kelvin Zou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 15/130,787

(22) Filed: Apr. 15, 2016

(65) Prior Publication Data

US 2017/0302565 A1    Oct. 19, 2017

(51) Int. Cl.
| | | |
|---|---|---|
| *G06F 15/16* | (2006.01) | |
| *H04L 12/721* | (2013.01) | |
| *H04L 12/751* | (2013.01) | |
| *H04L 12/713* | (2013.01) | |
| *H04L 12/24* | (2006.01) | |

(52) U.S. Cl.
CPC .............. *H04L 45/14* (2013.01); *H04L 41/12* (2013.01); *H04L 45/02* (2013.01); *H04L 45/586* (2013.01)

(58) Field of Classification Search
CPC ........ H04L 45/14; H04L 45/02; H04L 45/586
USPC ....................................................... 709/223
See application file for complete search history.

(56) References Cited

U.S. PATENT DOCUMENTS

| | | | | |
|---|---|---|---|---|
| 7,477,843 | B1* | 1/2009 | Peeters .............. | H04Q 11/0062 398/49 |
| 9,184,845 | B1 | 11/2015 | Vahdat et al. | |
| 9,184,999 | B1* | 11/2015 | Kabbani ................. | H04L 41/12 |
| 9,319,264 | B1* | 4/2016 | Poutievski ........ | H04L 29/08315 |
| 2006/0193035 | A1* | 8/2006 | Zyskind ............. | H01S 3/06758 359/337.4 |
| 2009/0040943 | A1* | 2/2009 | Le Roux ................. | H04L 45/00 370/254 |

FOREIGN PATENT DOCUMENTS

EP            2637363 A1        9/2013

OTHER PUBLICATIONS

"International Search Report and Written Opinion Issued in PCT Application No. PCT/US2017/026476", dated Jun. 23, 2017, 12 Pages.
Greenburg, et al., "VL2: A Scalable and Flexible Data Center Network", In Proceedings of Communications of the Association for Computing Machinery, vol. 54, Issue 3, Mar. 1, 2011, pp. 95-104.

* cited by examiner

*Primary Examiner* — Viet D Vu
(74) *Attorney, Agent, or Firm* — Schwegman Lundberg & Woessner, P.A.

(57) ABSTRACT

Techniques and architectures may be used to generate data center network topologies that use less reliable and less expensive links mixed with links of higher reliability. Such topologies may be categorized into reliability classes, where each class corresponds to a bound(s) on reliability of paths that include the links. A topology class may be selected for use by an application based, at least in part, on the degree of reliability demanded by the application.

20 Claims, 6 Drawing Sheets

DATA CENTER TOPOLOGY HAVING MULTIPLE CLASSES OF RELIABILITY

BACKGROUND

As capacity requirements for data center networks (DCNs) in public and private clouds increase, copper-based electrical links are being phased out in favor of fiber-optic links. For example, in DCNs with link capacities of 10 Gbps or higher, switch-to-switch links are generally optical. In some cases, electrical links may remain between servers and top-of-rack (ToR) switches.

An optical link in a data center may comprise transceivers at each end of the optical link, which are connected via optical fiber. The transceivers may plug into switches or servers and convert signals between optical and electrical domains.

Generally, links of a data center have a relatively high degree of reliability resulting from overprovisioning of the optical layer by current manufacturing and design practices. For example, transceivers may be manufactured to a stringent requirement based on worst-case assumptions about anticipated operating conditions (e.g., the amount of signal loss or corruption due to connectors in a data center). Such overprovisioning may result in equipment costs that are larger than necessary while adding little or no benefit to operating performance.

SUMMARY

This disclosure describes techniques and architectures for creating data center network topologies that use less reliable (and less expensive) links mixed with links of higher reliability. Such topologies may be categorized into reliability classes, where each class corresponds to a bound(s) on reliability of paths that include the links. A topology class may be selected for use by an application based, at least in part, on the degree of reliability demanded by the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), quantum devices, such as quantum computers or quantum annealers, and/or other technique(s) as permitted by the context above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
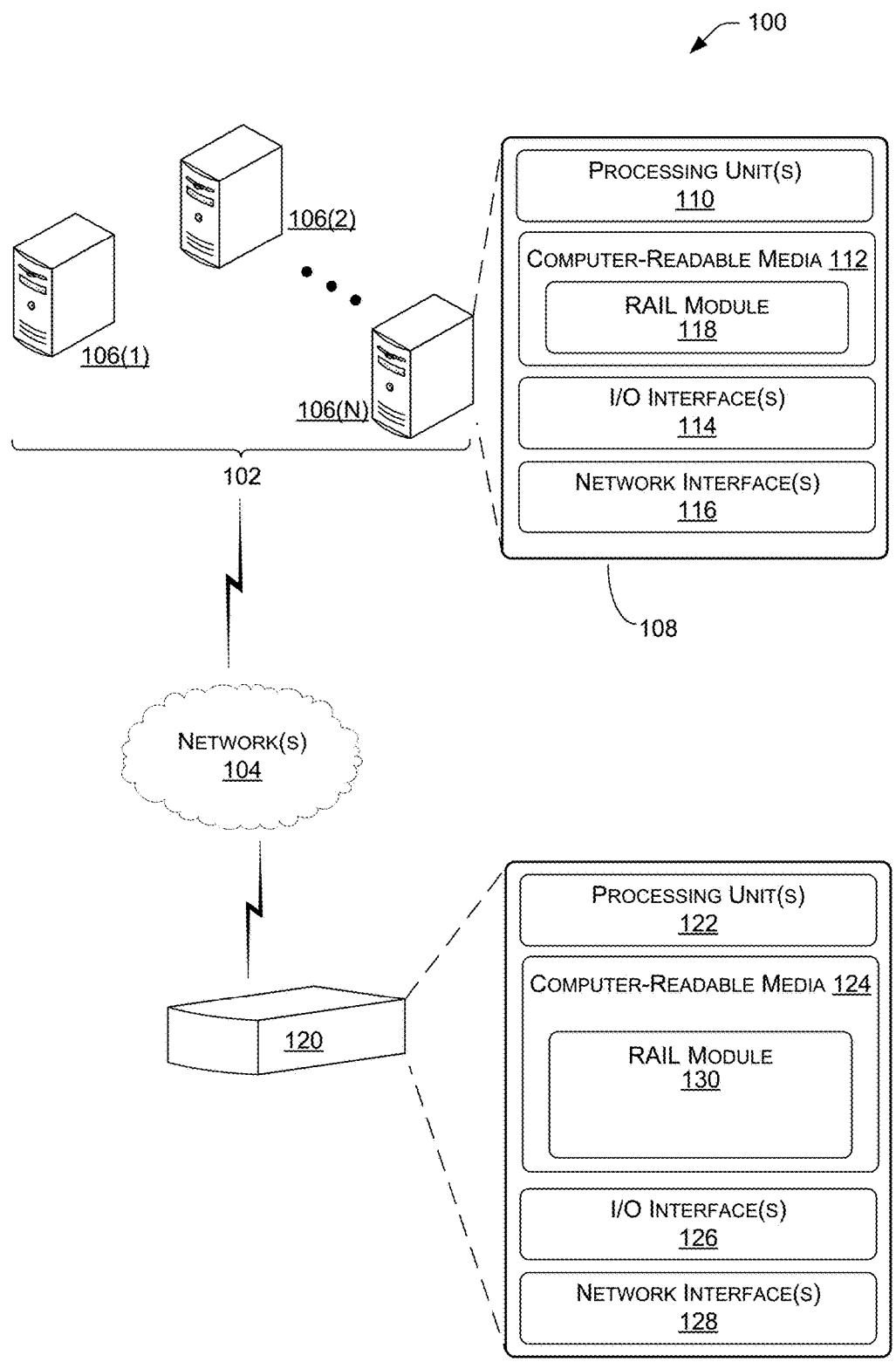
FIG. 1 is a block diagram depicting an environment for generating and operating with virtual network topologies, according to various examples.

Data center networks (DCNs) generally have been designed with a goal that each link of the network has a packet loss rate lower than $10^{-8}$ so that the network can operate satisfactorily with the most loss-sensitive applications. Such applications, for example, demand relatively high reliability for the links used to transfer data associated with the applications. This relatively high level of reliability, however, generally involves relatively expensive hardware, such as optical transceivers that are used as links. This relatively high level of reliability for all links of a network may be unnecessary for many data center applications that do not demand such a high level of reliability. This is because a data center network generally has many paths at any given time and loss-sensitive applications' demand for reliability may be satisfied by any such paths that can provide high reliability. For example, a relatively high level of reliability for all links of a network may ensure that the error rate of even the worst link or path in a network may meet the demands of the most demanding applications. Links or paths may perform significantly better than necessary because actual operating conditions are generally milder and links are relatively shorter.

Techniques and architectures described herein involve creating data center network topologies that intentionally include hardware components having reliability that is relatively low as compared to other hardware components in the topology. For example, some links in the topology may have less reliability than other links. Such inclusion of relatively low-reliability components may allow for lower cost for building and/or maintaining a data center because, generally, lower reliability components correspond to lower cost components. Such inclusion of relatively low-reliability components may be achieved with negligible or no detrimental impact to performance of the data center.

For convenience, a system that performs example operations described herein is called RAIL (redundant arrays of inexpensive links), though claimed subject matter is not limited to any implications set forth by the meanings of words of this term.

RAIL may comprise a process or system to ensure that, in a data center network having links of differing reliability, applications use paths that meet their reliability needs. RAIL may generate multiple virtual topologies over a data center network such that each virtual topology provides a bound (e.g., threshold) on minimum path reliability. In a particular example, implementation of RAIL may reduce network cost by up to about 10% for 10 Gbps networks and up to about 25% for 40 Gbps networks, while ensuring that about 99.8% of network paths continue to meet desired reliability.

RAIL may comprise a system for routing and forwarding application data in DCNs. In some examples, RAIL may, given a DCN where links have different error rates, ensure that application traffic is mapped only to paths with the desired (or better) reliability level of the application. Thus, highly loss-sensitive applications may be mapped to extremely reliable paths, highly loss-tolerant ones may be mapped to any path, and those with an intermediate tolerance level may be mapped to paths with intermediate reliability. Herein, "loss" refers to data loss and/or data corruption.

RAIL may be used to produce a network that includes some paths (e.g., including links) that are unable to satisfy reliability demands of some applications. Accordingly, RAIL may maintain sufficient application performance by ensuring that applications use paths that meet reliability needs of the applications. RAIL may be used to build multiple virtual topologies on a single physical topology. Each such virtual topology may be categorized as a class of the physical topology that provides a bound or threshold on maximum loss rate on any path in the class. For example, a first-class topology may provide a path loss guarantee that is the same as or similar to what data center network designs have generally provided, while higher topology classes are increasingly (and intentionally) less reliable. In various examples, an application may use a virtual topology class that meets the demands of the application. Thus, for instance, a loss-tolerant application may use a virtual topology having less reliable paths.

As described above, a data center network may be overprovisioned (e.g., more than sufficient to perform) at the optical layer of the network, resulting in excess hardware cost. Such overprovisioning may occur due to a cumulative impact of manufacturing and transceiver selection processes.

For example, during a design phase, manufacturers may power-provision transceivers using worst-case assumptions about an anticipated operating environment. Thus, the manufacturers may design for a case where the attenuation due to connectors will be a relatively large amount and the transceiver will be expected to experience a wide range of temperatures. Further, the manufacturing process may produce transceivers having a range of quality. Post-manufacturing, vendors may test and discard devices that do not meet a minimum quality. Transceivers that make the cut (e.g., are selected subsequent to the tests) may be substantially above the minimum quality. The fraction of transceivers that make the cut is known as the yield of the manufacturing process (e.g., higher yield may correspond to less waste and cheaper transceivers.)

In some examples, operators select transceivers for a network by starting with a physical layout of racks and switches of the network and considering how optical fibers will traverse in the network. Based on the physical layout and optical fiber transversal considerations, the operators may select the cheapest transceiver that can support a transmission distance that is larger than a required reach. For example, a transceiver that can reach over 10 kilometers may be selected (and overprovisioned) for a reach of 700 meters.

In combination, the impact of manufacturing and transceiver selection processes described above may ensure that the receive-side signal quality at any DCN link is above what is needed for $10^{-12}$ bit error rate (BER) (which may result in a $10^{-8}$ packet error rate, for example). However, the quality of the vast majority of the DCN links may be significantly higher than necessary because the transceivers are higher-than-necessary quality, and operating conditions and link distances are generally shorter than respective design thresholds.

Accordingly, such worst-case design goals may have a direct impact on network hardware costs. Transceivers are generally the single-largest contributor to network cost. As mentioned above, overprovisioning may be unnecessary because of the diversity of applications that are run in a DCN and path redundancy in the DCN. For example, some applications executed in a data center do not need $10^{-12}$ BER. In addition, since there may be many paths connecting two particular points in a DCN, reliability demands of loss-sensitive applications may be satisfied while there are enough paths for such applications.

Accordingly, a RAIL process may, with a relatively high probability, provide highly reliable paths between pairs of points (e.g., Top-of-Rack pairs) in a DCN. While there are multiple ways to achieve this goal, one particular method includes relaxing the power budget for transceivers. Such relaxation may lower network cost by i) allowing operators to use existing transceivers over longer distances, or ii) allowing manufacturers to build cheaper transceivers (e.g., by increasing manufacturing yield, using lasers with larger spectral width or less sensitive photo-diodes, or using cheaper, higher-loss packaging and coupling elements). Link BERs may increase due to this relaxation, but considering the small fraction of links that are close to the receiver sensitivity threshold, high BERs would be experienced by only a small fraction of links and paths.

Various examples are described further with reference to FIGS. 1-8.

FIG. 1 is a block diagram depicting an environment 100 for generating and operating with virtual network topologies, according to various examples. In some examples, the various devices and/or components of environment 100 include distributed computing resources 102 that may communicate with one another and with external devices via one or more networks 104.

For example, network(s) 104 may include public networks such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 may utilize communications protocols, including packet-based and/or datagram-based protocols such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, distributed computing resource(s) 102 includes computing devices such as devices 106(1)-106(N). Examples support scenarios where device(s) 106 may include one or more computing devices that operate in a cluster or other grouped configuration to share resources, balance load, increase performance, provide fail-over support or redundancy, or for other purposes. Although illustrated as desktop computers, device(s) 106 may include a diverse variety of device types and are not limited to any particular type of device. Device(s) 106 may include specialized computing device(s) 108.

For example, device(s) 106 may include any type of computing device having one or more processing unit(s) 110 operably connected to computer-readable media 112, I/O interfaces(s) 114, and network interface(s) 116. Computer-readable media 112 may have a RAIL module 118 stored thereon. For example, RAIL module 118 may comprise computer-readable code that, when executed by processing unit(s) 110, generate virtual network topologies for a data center. Also, a specialized computing device(s) 120, which may communicate with device(s) 106 via networks(s) 104, may include any type of computing device having one or more processing unit(s) 122 operably connected to computer-readable media 124, I/O interface(s) 126, and network interface(s) 128. Computer-readable media 124 may have a specialized computing device-side RAIL module 130 stored thereon. For example, similar to or the same as RAIL module 118, RAIL module 130 may comprise computer-readable code that, when executed by processing unit(s) 122, generate virtual network topologies for the data center.

Figure 2:
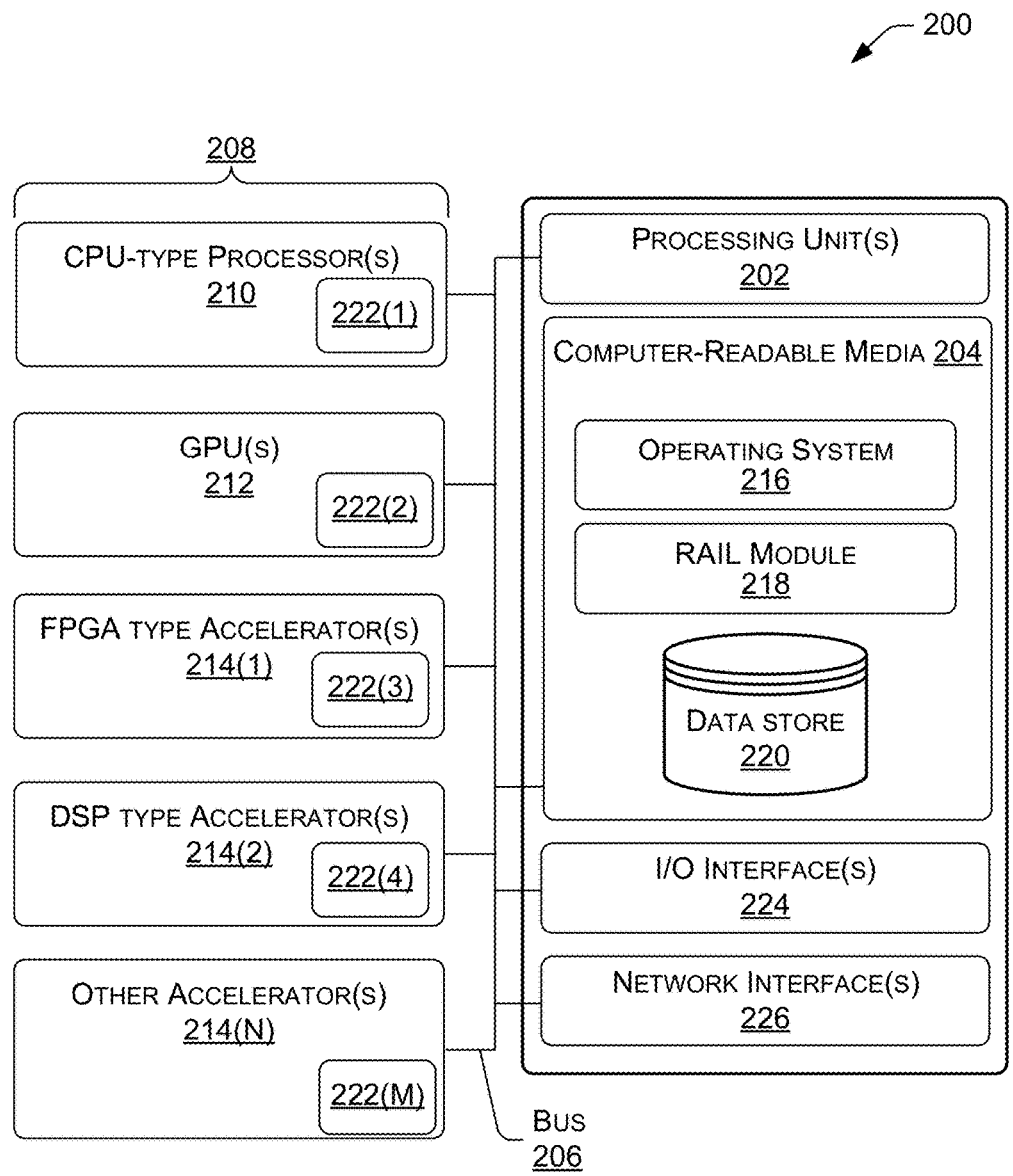
FIG. 2 is a block diagram depicting a device for generating and operating with virtual network topologies, according to various examples.

FIG. 2 depicts an illustrative device 200, which may represent device(s) 106 or 108, for example. Illustrative device 200 may include any type of computing device having one or more processing unit(s) 202, such as processing unit(s) 110 or 122, operably connected to computer-readable media 204, such as computer-readable media 112 or 124. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. The computer-readable media 112 and the computer-readable media 124 are examples of computer storage media. Computer storage media include, but are not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media does not include communication media.

Device 200 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s) 208, such as CPU-type processors (e.g., micro-processors) 210, GPUs 212, or accelerator device(s) 214.

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 210, executable by a GPU 212, and/or executable by an accelerator 214, such as an FPGA type accelerator 214(1), a DSP type accelerator 214(2), or any internal or external accelerator 214(N).

Executable instructions stored on computer-readable media 202 may include, for example, an operating system 216, a RAIL module 218, and other modules, programs, or applications that may be loadable and executable by processing units(s) 202, and/or 210. For example, RAIL module 218 may comprise computer-readable code that, when executed by processing unit(s) 202, generate virtual network topologies for a data center. Alternatively, or in addition, the functionally described herein may be performed by one or more hardware logic components such as accelerators 214. For example, and without limitation, illustrative types of hardware logic components that may be used include Field-programmable Gate Arrays (FPGAs), Application-specific Integrated Circuits (ASICs), Application-specific Standard Products (ASSPs), quantum devices, such as quantum computers or quantum annealers, System-on-a-chip systems (SOCs), Complex Programmable Logic Devices (CPLDs), etc. For example, accelerator 214(N) may represent a hybrid device, such as one that includes a CPU core embedded in an FPGA fabric.

In some examples, RAIL module 218 may comprise a topology module to receive information regarding reliability of links of a physical topology of a data center network. The topology module may, based at least in part on the reliability of the links, generate one or more virtual topologies of the data center network so that each of the generated virtual topologies corresponds to an upper bound (e.g., upper threshold) of reliability. In some examples, RAIL module 218 may comprise an error correction module to correct bit errors in data transferred in the one or more virtual topologies. An extent to which the bit errors are corrected may be based, at least in part, on a rate of data loss on the one or more virtual topologies. In some examples, RAIL module 218 may comprise a memory module configured to access some or all portions of computer-readable media 204 and operable by operating system 216. The memory module may store a description of a physical topology of a data center network, for example.

In the illustrated example, computer-readable media 204 also includes a data store 220. In some examples, data store 220 includes data storage such as a database, data warehouse, or other type of structured or unstructured data storage. In some examples, data store 220 includes a relational database with one or more tables, indices, stored procedures, and so forth to enable data access. Data store 220 may store data for the operations of processes, applications, components, and/or modules stored in computer-readable media 204 and/or executed by processor(s) 202 and/or 210, and/or accelerator(s) 214. For example, data store 220 may store version data, iteration data, clock data, virtual and/or physical topology parameters, and other state data stored and accessible by RAIL module 218. Alternately, some or all of the above-referenced data may be stored on separate memories 222 such as a memory 222(1) on board CPU type processor 210 (e.g., microprocessor(s)), memory 222(2) on board GPU 212, memory 222(3) on board FPGA type accelerator 214(1), memory 222(4) on board DSP type accelerator 214(2), and/or memory 222(M) on board another accelerator 214(N).

Device 200 may further include one or more input/output (I/O) interface(s) 224, such as I/O interface(s) 114 or 126, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Device 200 may also include one or more network interface(s) 226, such as network interface(s) 116 or 128, to enable communications between computing device 200 and other networked devices such as other device 120 over network(s) 104. Such network interface(s) 226 may include one or more network interface controllers (NICs) or other types of transceiver devices to send and receive communications over a network.

Figure 3:
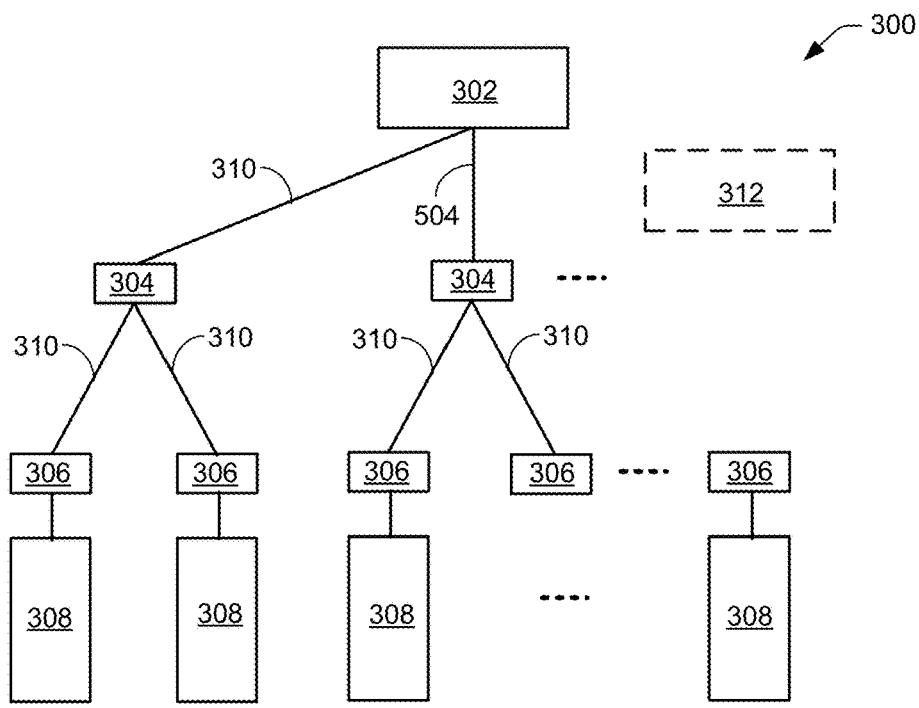
FIG. 3 is a schematic diagram of a topology of a data center, according to various examples.

FIG. 3 is a schematic diagram of a physical topology of a data center 300, according to various examples. In some implementations, a data center network may include electrical packet switches, arranged in multi-tier topologies such as fat trees or folded Clos topologies. While the switches may be electrical, links between the switches may be optical (e.g., optical fiber). Compared to electrical links, optical links are generally more cost-efficient at higher bandwidths or distances.

Data center 300 may include a core switch 302, aggregate switches 304, top of rack (ToR) switches 306, and racks of servers 308. Links 310 between the various types of switches may comprise transceivers, which are described below and illustrated in FIG. 4. Data center 300 may include a RAIL module 312 that, among other things, maintains information regarding the topology of the data center. Rail module 312 need not be physically located in data center 300 and may be located remotely from the data center in some examples.

An optical link may have transceivers at each end of the link, connected via optical fiber. There may be one fiber per path direction of the link, though transceivers may be configured to multiplex data in both directions over the same fiber. Optical technologies used in data centers may involve multi-mode optical fibers and single-mode optical fibers. Multi-mode fiber generally has a large diameter (e.g., 50/65 mm) that can accept multiple transmission modes (e.g., corresponding to angles at which light enters the fiber. On the other hand, because of its small diameter (e.g., 8 mm), single-mode fiber can accept only one mode.

Transceivers may plug into switches and convert signals between optical and electrical domains. Compared to single-mode transceivers, multi-mode transceivers are generally less costly because they have relaxed constraints for laser spectral width and for coupling of a laser beam with an optical fiber. But multi-mode transceivers may have a shorter reach, as compared to single-mode transceivers, because multi-mode transceivers are generally more susceptible to modal dispersion (e.g., optical signal distortion due to differing path of light waves propagating along a fiber).

In some examples, a large cloud provider may involve multiple data centers, such as data center 300, that includes thousands of multi-mode transceivers and hundreds of single-mode transceivers. Multi-mode transceivers may operate with links up to about 300 meters and single-mode transceivers may operate with links up to about 10 kilometers.

Figure 4:
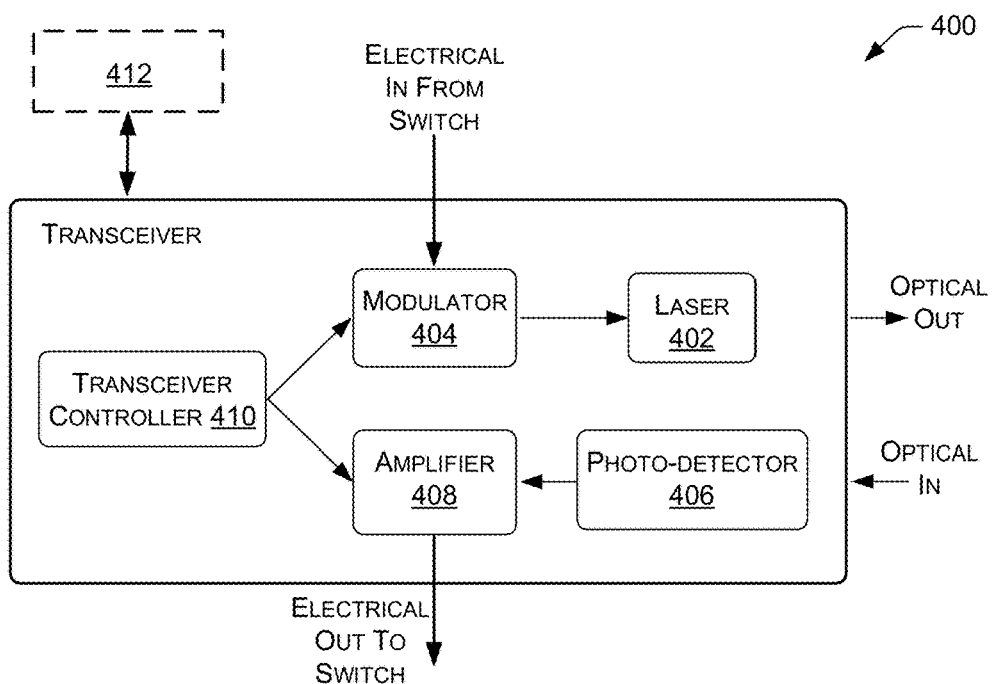
FIG. 4 is a block diagram of an example optical transceiver.

FIG. 4 is a block diagram of an example optical transceiver 400, which includes an optical transmit pipeline (OPTICAL OUT) and an optical receive pipeline (OPTICAL IN), each attached to an optical fiber. Optical transceiver 400 may be used to convert optical signals to electrical signals and vice versa. An optical transceiver may be located at each end of an optical link, for example.

The transmit pipeline may include a laser-emitting source 402 that produces laser light at a certain wavelength (e.g., centered at a narrow wavelength range) and a modulator 404 that modulates the laser light according to electrical input from an external switch (not illustrated). In the receive pipeline, transceiver 400 may decode optical signals back into the external switch using a photo-detector 406 and an amplifier 408. In some examples, not illustrated, the laser may be externally-modulated instead of internally-modulated, as in the case for transceiver 300.

A transceiver controller 410 may operate modulator 404 and amplifier 408. In some examples, a RAIL module 412 may monitor performance of optical transceiver 400. Such monitoring may be one of a number of techniques that enable RAIL module 412 to dynamically determine, in real-time for example, whether a transceiver (and thus an optical link) of a data center is operating or has failed.

Based, at least in part, on optical transceivers, the performance of optical communication (e.g., transfer of data bits) in a data center may be quantified using bit error rate (BER), which represents the probability of a single bit being misinterpreted at the receiver portion of a transceiver. For example, misinterpretation may occur if the optical power gap between bits 0 and 1 is too small to be reliably differentiated at the receiver portion. The gap can be small due to poor signal characteristics at the transmitter portion of the transceiver (e.g., a poor-quality laser may emit light over a relatively wide optical spectrum) or due to attenuation and dispersion during signal propagation. Attenuation may be described as a reduction in average signal power which may, for example, result from imperfect optical connectors that attach optical fibers to transceivers. Dispersion may be described as distortion of the shape of the optical signal.

A process for selecting a transceiver for use in a data center may consider an optical power budget, which may account for all sources of signal degradation including fiber-launch coupling loss, attenuation, and connector losses. Desirable transmitter characteristics for a transceiver may support a relatively low BER despite such possible signal degradations.

In some examples, temperature may be a relatively important factor in optical layer performance and cost of a DCN. Lasers and photo-diodes emit and absorb energy over a wavelength band that shifts with temperature. Substantial shifts may imply that the laser's output in the communication band will drop or the photo-diode's input power will drop. Designing transceivers that operate properly over a wide range of temperatures may be expensive. For example, extending a temperature range of operability for a transceiver from 70 degrees C. to 85 degrees C. may incur an extra 10% cost. Generally, transceivers operate in data centers that are temperature-controlled environments. Thus, transceivers that are designed to operate over a wide range of temperatures tend to be more "rugged" than needed. This is an example over overprovisioning, as discussed above.

Figure 5A:
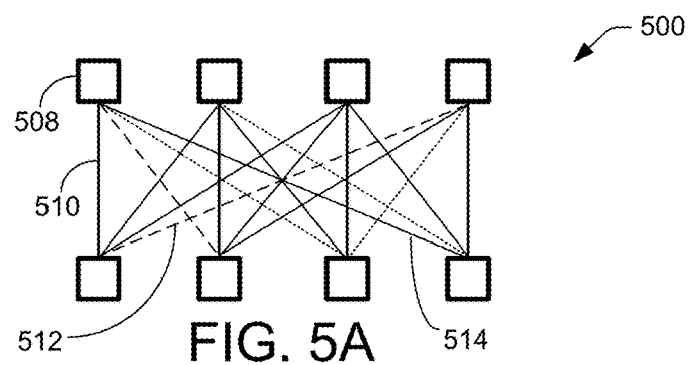
FIGS. 5A-5D are schematic diagrams of topologies of a data center, according to various examples.
Figure 5B:
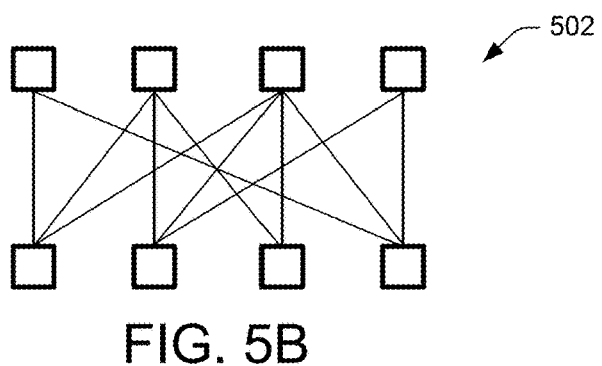
Figure 5C:
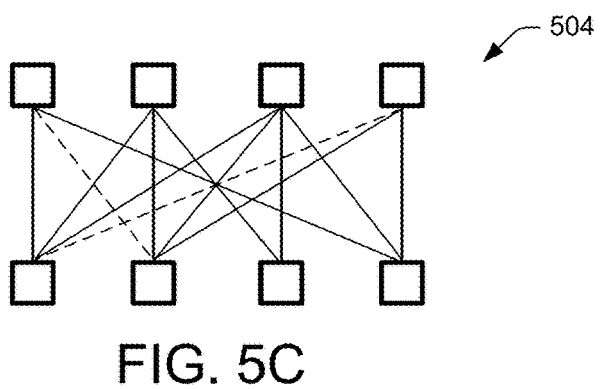
Figure 5D:
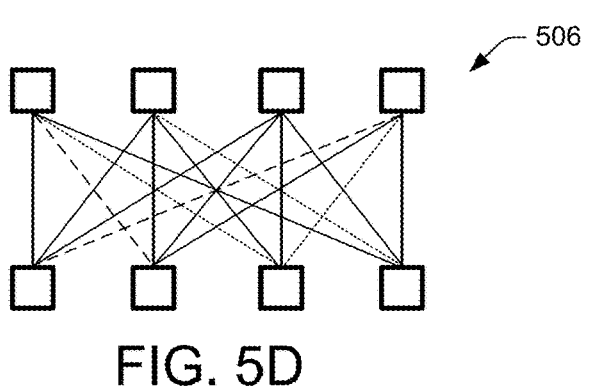

FIGS. 5A-5D are schematic diagrams of topologies of a DCN, according to various examples. In particular, FIG. 5A illustrates a physical topology 500 of the DCN and FIGS. 5B-5D illustrate virtual topologies 502-506 of the DCN. Schematically, squares 508 represent ToR switches or other points of the DCN, solid lines 510 between squares 508 represent high-reliability paths with a lower bound (e.g., lower threshold) of reliability, dashed lines 512 between squares represent lower-reliability paths with upper and lower bounds of reliability, and dotted lines 514 between squares represent lowest-reliability paths with an upper bound of reliability.

In some examples, a RAIL module, such as 118, 130, or 218, may generate any number k of virtual topologies based, at least in part, on physical topology 500. In the case illustrated in FIGS. 5A-5D, k=3. Each virtual topology corresponds to a class that corresponds to a bound(s) on the worst path in that topology. Here, "worst" and "bound" refer to reliability of the path in terms of BER, for example. The worst path of a first class virtual topology may have a BER above a relatively high threshold value. The worst path of a second class virtual topology may have a BER above a relatively lower threshold value. The worst path of a third class virtual topology may have a BER above a relatively low threshold value.

For example, the RAIL module may generate a first class topology 502 to include the most reliable paths in physical topology 500, while excluding less reliable paths. Thus, first class topology 502 is illustrated to include solid lines representing high-reliability paths with a lower bound of reliability. The RAIL module may generate a second-class topology 504 to include paths with a second lower bound of reliability. Thus, second class topology 504 is illustrated to include solid lines representing high-reliability paths and lower-reliability paths. The RAIL module may generate a third-class topology 506 to include paths with a third lower bound of reliability. Thus, third class topology 506 is illustrated to include all paths included in physical topology 500.

Within a virtual topology, routing and forwarding processes for application data may obey preferences of operators of the DCN for their physical topology (e.g., equal-cost multi-path routing (ECMP) over equal hop paths). Virtual topologies may be exposed to end hosts as different (virtual) interfaces. An application can bind to an interface that corresponds to the reliability criteria of the application. Thus, the most-sensitive applications (e.g., remote direct memory access (RDMA)) may bind to an interface for first-class topology 502, transmission control protocol (TCP) data flows may bind to second-class topology 504, and bulk transfers may bind to third-class topology 506. In some implementations, applications need not account for (e.g., be aware of) processes performed by a RAIL module, though such applications may set forth their reliability demands that will be considered by the RAIL module. For example, an application, which may be hosted by the DCN, may include or be associated with metadata that specifies what level of reliability the application demands for proper operation.

In some examples, virtual topologies generated by a RAIL module may share the same physical fabric but offer different guarantees for the maximum loss rate along any of the paths in the virtual topologies. The RAIL module may maintain an up-to-date view of the BER of each link in physical topology 500 by polling switches in the DCN, for example. Link BERs are generally relatively static, allowing for maintaining such an up-to-date view. In addition to providing a worst-case path loss rate guarantee, a virtual topology may include as many links as possible to maximize the capacity of the virtual topology. In some examples, a fast, greedy algorithm may be used to generate a virtual topology while avoiding computationally expensive optimal searching for a topology. Speed of virtual topology generation may be important because, while link BERs are relatively static, links may fail, and virtual topologies may be re-generated when links fail or recover.

Figure 6:
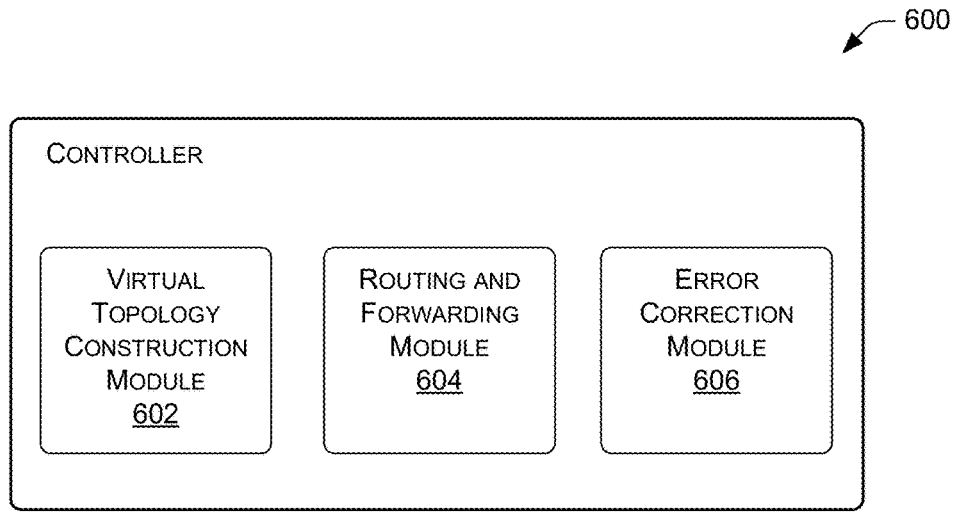
FIG. 6 is a block diagram of an example controller.

FIG. 6 is a block diagram of an example controller 600 that may be a portion of a RAIL module, such as 118, 130, or 218. Controller 600 may include a virtual topology construction (VTC) module 602, a routing and forwarding (RaF) module 604, and an error correction module 606. For example, a RAIL module may utilize any portion of controller 600 to perform a number of functions and processes described below.

In some examples, VTC module 602 may generate a relatively low-reliability class virtual topology by selecting links of a physical topology of a data center that have relatively low-reliability. Such generation may involve iteratively and virtually removing low-reliability links from the physical topology until a lower bound of reliability for the physical topology is reached. Additionally, VTC module 602 may generate a relatively high-reliability class virtual topology by selecting links of the physical topology that have relatively high-reliability. Such generation may involve iteratively and virtually removing low-reliability links from the relatively low-reliability class virtual topology until a lower bound of reliability for the physical topology is reached. In some cases, the relatively high-reliability class virtual topology may be a subset of the relatively low-reliability class virtual topology.

In some examples, VTC module 602 may add links from the relatively low-reliability class virtual topology to the relatively high-reliability class virtual topology in response to a number of links of the relatively high-reliability class virtual topology falling below a threshold value. Additionally, VTC module 602 may modify the relatively low-reliability class virtual topology and the relatively high-reliability class virtual topology in response to failure of one or more links of the physical topology. As mentioned above for a RAIL module, VTC module 602 may select a path for data transfer of an application based, at least in part, on reliability demands of the application.

In some examples, VTC module 602 may generate a number of classes of virtual topologies for a DCN by performing a process having k rounds, one round corresponding to one topology. In each round, the process may begin with a set of candidate links of the DCN for the topology and iteratively remove relatively low reliability links until required performance criteria (e.g., a lower bound of BER) can be met. For example, the process may begin with the kth class (least reliable) virtual topology. In this class, all links (that are currently alive) of the DCN may be considered to be initial candidates. The process then determines the ToR-to-ToR path having the worst loss rate (e.g., highest BER) of all the candidates. If that loss rate is higher than the required bound, the process removes the link (on the path) with the highest BER. Such link-removal iterations may be repeated until the worst-case path meets the required loss rate bound. The process then begins the next round, for the topology that is one class lower (e.g., (k−1)th), starting with links that were not removed in the previous round.

The efficiency of the above process may, at least partly, rely on quickly finding the worst path. Computing the loss rate for all possible ToR-to-ToR paths may be intractable for relatively large data centers. For example, in a 3-stage fat tree with 512 ToRs, 512 aggregation switches, 256 core switches, with each switch having 32 ports, there are about $512^2$ ToR-to-ToR pairs. Since each ToR-to-ToR pair has about 256 paths, the overall number of paths may be about $6.7 \times 10^7$.

A process performed by VTP module 602 may quickly identify the worst path of a topology by exploiting the topological structure of DCNs. Though the following process may be used for fat trees, similar techniques can be developed for other topologies. Most ToR-to-ToR paths in a fat tree may comprise ToR-to-core and core-to-ToR paths and there may be a unique path between a pair of ToR and core switches. Based on this information, the process may compute the worst path that traverses each core switch, by combining the worst path from any sender ToR to that core switch and the worst path from the core switch to any receiver ToR. The sender and receiver ToRs in this computation do not belong to the same subtree, because the path between them will not traverse the core switch. To account for such paths, the process may compute the worst paths for each aggregation switch and the ToRs it serves. Then, the worst path across the topology may be the worst path across all core and aggregation switches.

A process for such topology construction may run multiple times until the worst path meets the requirement. The process may further optimize topology construction by maintaining a matrix of ToR-core and ToR-aggregation paths and updating the matrix as the process iteratively remove links.

To be useful for forwarding, virtual topologies must be connected. Because higher-class topologies may be supersets of lower-classes topologies, topologies may be connected if the first class topology is connected, and the first class topology may be connected with a relatively high probability. For example, consider all links with $10^{-12}$ BER guarantee, because such links are in the first class topology. As long as those links form a connected topology, the first class topology may be fully connected. Assume that a link corrupts packets (i.e., higher BER than $10^{-12}$) with probability s. For a path with h hops, the probability of a path without corruption is equivalent to guaranteeing none of the hops in the path corrupts packets. Thus, the probability of a good path is $(1-s)^h$. If there are n end-to-end paths that are link disjoint, the probability of all the paths corrupting packets is shown in Equation 1 as $$(1-(1-s)^h)^n. \quad \text{Eqn. 1}$$

Thus, for a 2-stage network with m racks, the probability of finding at least one good path between all pairs of racks is shown in Equation 2 as at least $$1-m(m-1)(1-(1-s)^2)^n. \quad \text{Eqn. 2}$$

For networks with more stages, typically there is considerable redundancy between the aggregation layer and the core. If so, the process may neglect the impact of bad links at the higher tiers of the network. Thus, for a data center with k subtrees and m racks in each subtree, the probability of finding at least one good path between any pair of racks is shown in Equation 3 as at least $$1-km(km-1)(1-(1-s)^4)^h u\ n. \quad \text{Eqn. 3}$$

For the same 512 ToR topology described above, even when s=5%, the probability of finding at least one good path between any pair of racks may be at least 99.99995%. This bound may highly depends on the redundancy of the topology.

In relatively rare cases where the first-class topology does not provide enough paths (e.g., 50% of total) between a pair of ToRs, a RAIL module may incrementally add links with best BERs among links that are not already part of the first-class topology until the requirement for the number of paths can be met. These links are then added to the higher-class topologies as well, for example.

To simplify routing and forwarding, RaF module 604 may use a non-overlapping IP address space within each virtual topology. For example, switches may be configured such that, when routing or forwarding for a topology, the switches ignore links that are not part of that topology. The exact mechanism may depend on the routing paradigm used by the data center. If the data center uses a distributed protocol such as border gateway protocol (BGP) to compute paths, RaF module 604 may configure BGP to not announce prefixes for a virtual topology over links that are not part of it. No RAIL-specific changes may be made to switch software, and packets may be forwarded using, for example, ECMP if multiple equal cost paths are found for a topology.

If the data center uses a software-defined networking (SDN) controller to centrally compute forwarding paths, RaF module 604 may either instantiate one controller per virtual topology or use one network-wide controller that is programmed to not use certain links for given prefixes.

If the application or transport protocol is not robust to small amounts of corruption-based loss, error correction module 606 of controller 600 may be used to help ensure relatively high performance in exchange for slight bandwidth overhead. Error correction module 606 may be completely transparent to applications.

As mentioned above, given the diversity of loss rates across paths, it may be important that error correction be based on the loss rate of the path, rather than being guided by the worst-case or average loss rate in the virtual topology. Because of ECMP-hashing, hosts need not be aware of the path taken by a flow.

DCNs may include applications such as large transfers that are otherwise loss-tolerant but perform poorly when the transport protocol (e.g., TCP) is not robust to losses. For such applications, error correction module 606 may use a transparent coding-based error correction scheme.

While switches of a DCN may have multiple error counters, these counters typically aggregate across classes of errors. A cyclic redundancy check (CRC) error counter, which may capture all types of corruption errors, may use additional analysis to identify errors due to optical issues.

Error correction module 606 may learn the path loss rate in two steps. First, as soon as a new flow starts, the source host may send a trace route probe with a header (e.g., 5-tuple) that is identical to that of the flow. This probe may reveal the path taken by the flow. Error correction module 606 may use special differentiated services code point (DSCP) bits in the IP header of the probe packet, to indicate to the destination host module that it should not deliver the packet to the application. Second, error correction module 606 may query the RAIL module for path loss rate of the path.

Error correction module 606 may then start sending coded, "parity" packets after every d data packets, where d is based on the path loss rate. Error correction module 606 may use XOR encoding because it is lightweight and known to be effective. That is, after every d data packets, the sender sends a packet whose content is the XOR of the previous d packets. In this coding scheme, as long as d out of the d+1 packets are successfully delivered, the receiver may recover the original d packets. Losing two or more packets within a group of d+1 packets results in data loss.

If the path loss rate is p, the probability of having two or more losses among d+1 packets is shown in Equation 4 is $$1-(1-p)^{d+1}-(d+1)p(1-p)^d.\qquad\text{Eqn. 4}$$

Variable d is selected such that this probability is lower than the desired post-recovery loss probability t (experienced by applications). Any path with p<t need not use any error correction. To show an example of computing d, error correction module 606 may first quantify t for a particular transport. TCP's performance may degrade if the loss rate is above 0.1%, for example, so a value of t=0.1% may be selected. For a path loss rate of p=0.3%, d may be selected to be 14 so that the post recovery loss rate is again 0.092% <0.1%. The bandwidth overhead in this case is 7.1%, for example.

For a given virtual topology, a process performed by controller 600 may consider all paths that meet the loss criteria. Thus, most paths may have zero to low loss. Even if coding overhead is relatively high for a particular flow, the average overhead may be small.

In some examples, error correction module 606 may sit below the kernel TCP/IP stack so that error correction module 606 is oblivious to the transport protocol. Error correction module 606 may be implemented as a driver for a tun/tap device in a Linux kernel, for example. (On Windows®, a WinSock kernel device driver may be used.) The driver may maintain a buffer of size b so that the driver can decode the coded packet if needed and deliver packets to higher layers in order. The driver may maintain a fine-grained timer such that if a missing packet is not recovered within a short time window, the next packet is delivered to the transport protocol (e.g., TCP). This delivery may trigger a recovery at the transport layer. Such transport layer retransmissions are new packets for error correction module 606.

To identify packets for coding and decoding, a 4-byte header may be inserted after the IP header that contains a sequence number. Once the encoding rate is negotiated, coded packets and data packets may have separate sequence numbers. The parity packet has the last sequence number in each group of b. Because it tracks the exact path to the destination, error correction module 606 may perform cross flow error correction among all the flows with the same path. As long as some flows are running on the path, the timeout need not be triggered and the recovery may be immediate.

Figure 7:
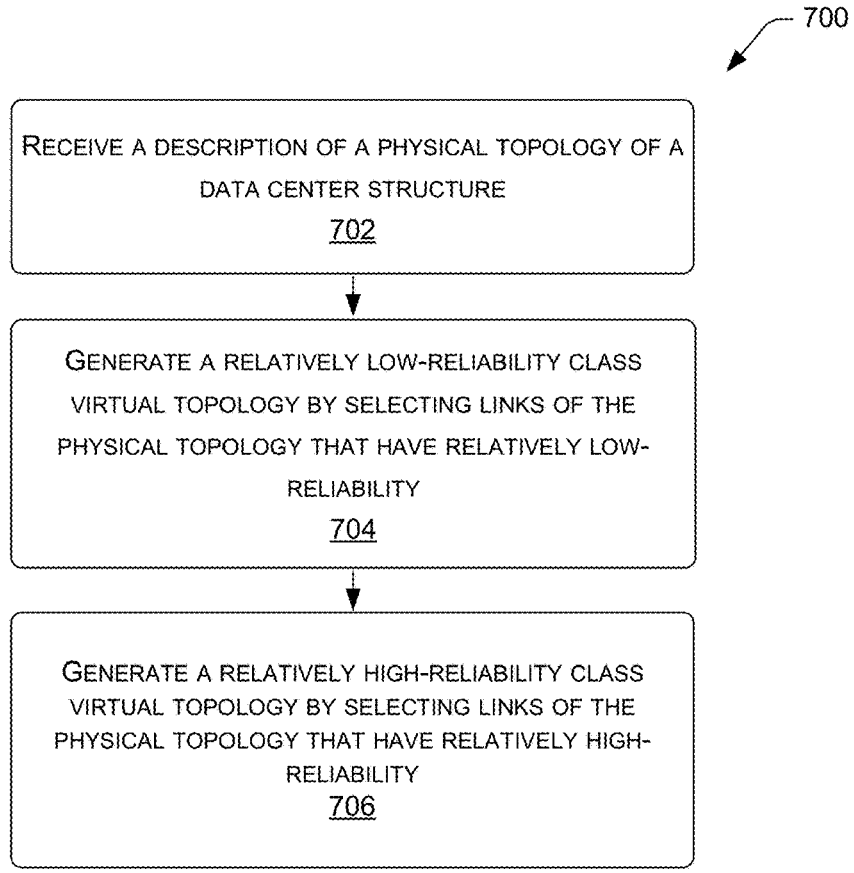
FIG. 7 is a flow diagram illustrating a process for generating virtual topologies for a data center, according to some examples.

FIG. 7 is a flow diagram illustrating a process 700 for generating virtual topologies for a data center, according to some examples. The flows of operations illustrated in FIG. 7 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIG. 7 may represent modules, segments, or portions of code that include one or more executable instructions for implementing specific logical functions or variables in the process.

Process 700 may be performed by a processor such as processing unit(s) 110, 122, and 202, for example. At block 702, the processor may receive a description of a physical topology of a data center network. The data center network may include a predetermined portion of links that have relatively low reliability, as discussed above. At block 704, the processor may generate a relatively low-reliability class virtual topology by selecting links of the physical topology that have relatively low-reliability In some examples, generating the relatively low-reliability class virtual topology may include iteratively and virtually removing low-reliability links from the physical topology until a lower bound of reliability for the physical topology is reached.

At block 706, the processor may generate a relatively high-reliability class virtual topology by selecting links of the physical topology that have relatively high-reliability. Generating the relatively high-reliability class virtual topology may include iteratively and virtually removing low-reliability links from the relatively low-reliability class virtual topology until a lower bound of reliability for the physical topology is reached. In some examples, each of the low-reliability class virtual topology and the high-reliability class virtual topology are subsets of the physical topology of the data center network.

Though process 700 describes two virtual topologies (the low-reliability class virtual topology and the high-reliability class virtual topology), a particular implementation may involve data centers configured with three virtual topologies. In a particular case, the first-class virtual topology may provide paths with a reliability corresponding to each link having a BER less than $10^{-12}$. This virtual topology may be used to carry the most sensitive applications such as RDMA. The second class virtual topology may provide paths with a loss rate below about 0.1%, and may carry applications like short TCP flows, for example. The third-class virtual topology may provide paths with a loss rate below about 10% and, unless an application uses loss-tolerant transport, this virtual topology may be error corrected. For example, if the application is a long TCP flow, the third-class virtual topology may be error corrected to a reliability of about t=0.1%.

Figure 8:
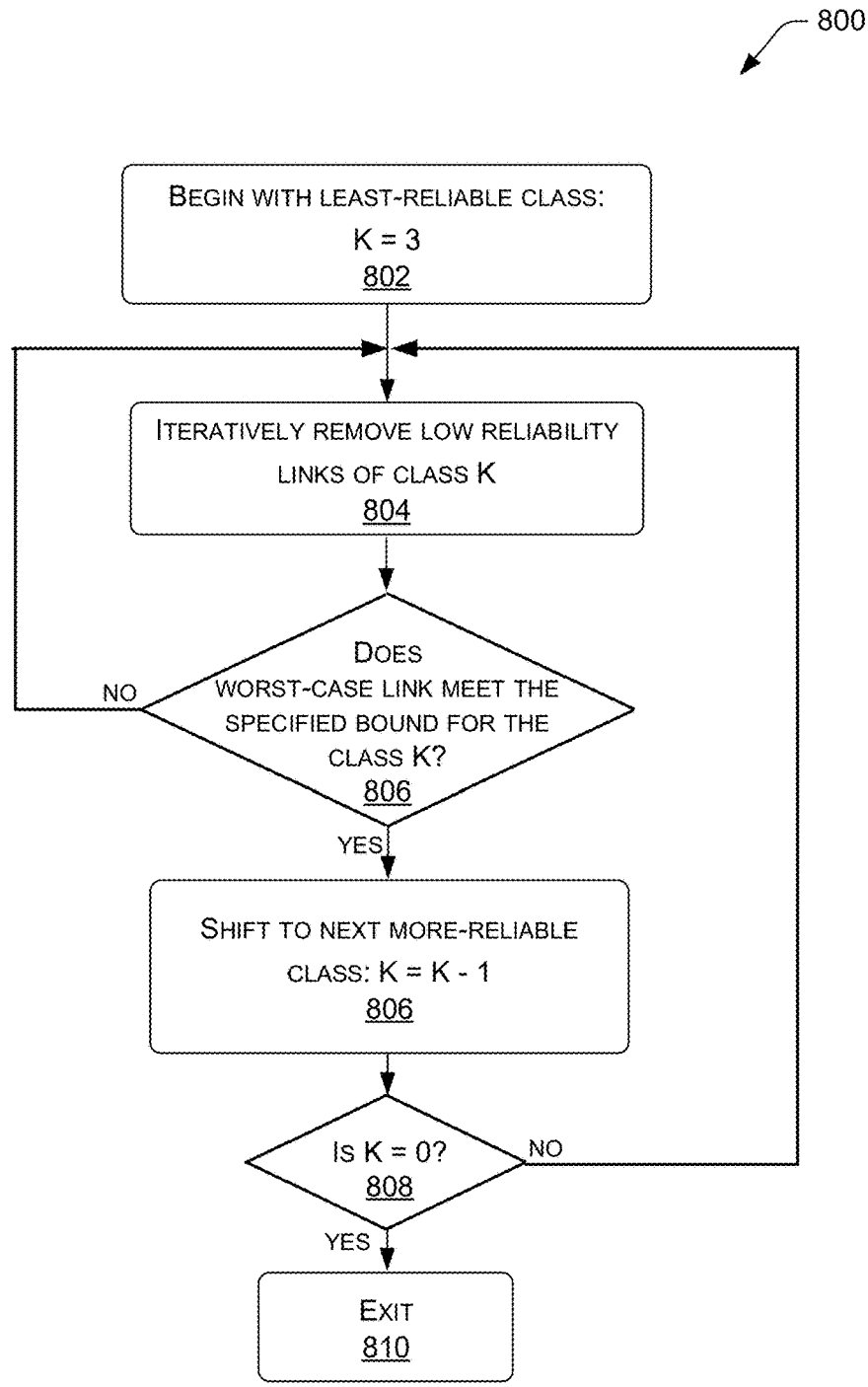
FIG. 8 is a flow diagram illustrating a process for generating classes of topologies, according to some examples.

FIG. 8 is a flow diagram illustrating a process 800 for generating classes of virtual topologies, according to some examples. The flows of operations illustrated in FIG. 8 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIG. 8 may represent modules, segments, or portions of code that include one or more executable instructions for implementing specific logical functions or variables in the process.

Process 800 may be performed by a processor such as processing unit(s) 110, 122, and 202, for example. Process 800 may involve k rounds, one round per topology. In each round, process 800 may start with a set of candidate links for the topology and iteratively remove low reliability links until the required reliability (e.g., BER) can be met. Process 800 begins with the k-th class (least reliable) topology. For this topology, all links (that are currently alive) may be considered initial candidates. Process 800 then finds the ToR-to-ToR path with the worst loss rate, and if that loss rate is higher than a predetermined threshold (e.g., bound), process 800 may remove the link (on the path) with the worst BER. Such link-removal iterations are repeated until the worst-case path meets the required loss rate bound. Process 800 then begins the next round, for the topology that is one class lower, starting with links that were not removed in the previous round.

In particular, at block 802, the processor may begin by generating a least-reliable class, k=3. At block 804, the processor may iteratively remove low reliability links of class k=3. At diamond 806, the processor may determine whether a worst-case path in class k=3 meets the specified (e.g., predetermined) bound for class k=3. If not, then process 800 begins an iterative loop, returning to block 804. If the condition in diamond 806 is satisfied, then process 800 may proceed to block 806, where the processor may shift to generating the next more-reliable class k=2. This shift is logically accounted for by subtracting one from the index k. At diamond 808, the processor may query whether the index k is zero, which would indicate that all classes of topologies have been generated. In this case, process 800 may proceed to exit at block 810. If not, then process 800 begins an iterative loop, returning to block 804 for the next lower class.

EXAMPLE CLAUSES

A. A system comprising: one or more processing units; a memory to store a description of a physical topology of a data center network; and computer-readable media with modules thereon, the modules to: receive information regarding reliability of links of the physical topology of a data center network; and based, at least in part, on the reliability of the links, generate one or more virtual topologies of the data center network, each of the generated one or more virtual topologies respectively having at least one reliability threshold value.

B. The system as paragraph A recites, wherein the one or more virtual topologies individually are subsets of the physical topology of the data center network.

C. The system as paragraph A recites, wherein the one or more virtual topologies of the data center network pertain to distinct classes, each of the classes having a corresponding set of physical links, each of the corresponding set of physical links having distinct levels of reliability.

D. The system as paragraph C recites, wherein the modules are further configured to: add links from a first class of the virtual topologies to a second class of the virtual topologies in response to a number of links of the first class of the virtual topology falling below a threshold value.

E. The system as paragraph A recites, wherein the modules are further configured to: receive information regarding status of the links; and dynamically generate additional virtual topologies in response to the status of the links indicating one or more failed links.

F. The system as paragraph A recites, wherein the modules are further configured to: select a path for data transfer of an application based, at least in part, on reliability demands of the application, wherein the path is included in the one or more virtual topologies.

G. The system as paragraph A recites, wherein the modules are further configured to: correct bit errors in data transferred in the one or more virtual topologies, wherein an extent to which the bit errors are corrected is based, at least in part, on a rate of data loss or corruption on the one or more virtual topologies.

H. The system as paragraph A recites, wherein the links of the physical topology of the data center network include top-of-rack switches.

I. A method comprising: receiving a description of a physical topology of a data center network; generating a relatively low-reliability class virtual topology by selecting a first set of links of the physical topology that have relatively low-reliability; and generating a relatively high-reliability class virtual topology by selecting a second set of links of the physical topology that have relatively high-reliability.

J. The method as paragraph I recites, further comprising: selecting a path for data transfer of an application based, at least in part, on reliability demands of the application, wherein the path is included in the relatively low-reliability class virtual topology or the relatively high-reliability class virtual topology.

K. The method as paragraph I recites, wherein the generating the relatively low-reliability class virtual topology comprises: iteratively and virtually removing low-reliability links from the physical topology until a lower threshold of reliability for the physical topology is reached.

L. The method as paragraph I recites, wherein the generating the relatively high-reliability class virtual topology comprises: iteratively and virtually removing low-reliability links from the relatively low-reliability class virtual topology until a lower threshold of reliability for the physical topology is reached.

M. The method as paragraph I recites, wherein the relatively high-reliability class virtual topology is a subset of the relatively low-reliability class virtual topology.

N. The method as paragraph I recites, further comprising: adding links from the relatively low-reliability class virtual topology to the relatively high-reliability class virtual topology in response to a number of links of the relatively high-reliability class virtual topology falling below a threshold value.

O. The method as paragraph I recites, further comprising: modifying at least one of the relatively low-reliability class virtual topology or the relatively high-reliability class virtual topology in response to failure of one or more links of the physical topology.

P. The method as paragraph I recites, wherein the data center network includes a predetermined portion of links that have relatively low reliability.

Q. One or more computer-readable media storing computer-executable instructions that, when executed on one or more processors, configure a computer to perform acts comprising: generating a low-reliability class virtual topology by selecting links of a physical topology of a data center network, wherein the selected links have relatively low-reliability; generating a high-reliability class virtual topology by selecting links of the physical topology that have relatively high-reliability; and selecting a route for data transfer of an application, the route being in either the low-reliability class virtual topology or the high-reliability class virtual topology, the selecting based, at least in part, on a reliability demand of the application.

R. The computer-readable media as paragraph Q recites, wherein the acts further comprise:

correcting bit errors in the data transfer, wherein a number of the bit errors that are corrected is based, at least in part, on a rate of data loss or corruption on the selected route.

S. The computer-readable media as paragraph Q recites, wherein the acts further comprise: adding links from the low-reliability class virtual topology to the high-reliability class virtual topology in response to a number of links of the relatively high-reliability class virtual topology falling below a threshold value.

T. The computer-readable media as paragraph Q recites, wherein each of the low-reliability class virtual topology and the high-reliability class virtual topology are subsets of the physical topology of the data center network.

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "may," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed is:

1. A system comprising:
    one or more processing units;
    a memory to store a description of a physical topology of a data center network; and
    computer-readable media with modules thereon, the modules to:
        receive information regarding reliability of links of the physical topology of the data center network;
        generate a low-reliability class virtual topology by selecting a first set of links of the physical topology that have low-reliability based on the information regarding reliability of links of physical topology of the data center network;
        generate a high-reliability class virtual topology from the first set of links of the physical topology, wherein the high-reliability class virtual topology initially includes the first set of links of the physical topology;
        determine loss rates of links from the first set of links of the physical topology;
        determine a second set of links whose loss rates are higher than a threshold, wherein the threshold is associated with the high-reliability class virtual topology; and
        remove the second set of links from the high-reliability class virtual topology such that paths within the high-reliability class has a loss rate lower than the threshold.

2. The system of claim 1, wherein the high-reliability class virtual topology and the low-reliability class virtual topology individually are subsets of the physical topology of the data center network.

3. The system of claim 1, wherein the high-reliability class virtual topology and the low-reliability class virtual topology of the data center network pertain to distinct classes, each of the classes having a corresponding set of physical links, each of the corresponding set of physical links having distinct levels of reliability.

4. The system of claim 3, wherein the modules are further configured to:
    add links from a first class of the virtual topologies to a second class of the virtual topologies in response to a number of links of the first class of the virtual topology falling below a threshold value.

5. The system of claim 1, wherein the modules are further configured to:
    receive information regarding status of the links; and
    dynamically generate additional virtual topologies in response to the status of the links indicating one or more failed links.

6. The system of claim 1, wherein the modules are further configured to:
    select a path for data transfer of an application based, at least in part, on reliability demands of the application, wherein the path is included in the high-reliability class virtual topology and the low-reliability class virtual topology.

7. The system of claim 6, wherein the modules are further configured to:
    determine a path loss rate of the path for the data transfer of the application; and
    determine a parity packet based on a number of packets sent as part of the data transfer of the application, wherein the number of packets is based on the determined path loss rate, and wherein the parity packet corrects bit errors in the number of packets.

8. The system of claim 1, wherein the links of the physical topology of the data center network include top-of-rack switches.

9. A method comprising:
receiving a description of a physical topology of a data center network;
generating a low-reliability class virtual topology by selecting a first set of links of the physical topology that have low-reliability;
generating a high-reliability class virtual topology from the first set of links of the physical topology, wherein the high-reliability class virtual topology initially includes the first set of links of the physical topology;
determining loss rates of links from the first set of links of the physical topology;
determining a second set of links whose loss rates are higher than a threshold, wherein the threshold is associated with the high-reliability class virtual topology;
removing the second set of links from the high-reliability class virtual topology such that paths within the high-reliability class has a loss rate lower than the threshold.

10. The method of claim 9, further comprising:
selecting a path for data transfer of an application based, at least in part, on reliability demands of the application, wherein the path is included in the low-reliability class virtual topology or the high-reliability class virtual topology.

11. The method of claim 9, wherein the generating the low-reliability class virtual topology comprises:
iteratively and virtually removing low-reliability links from the physical topology until a lower threshold of reliability for the physical topology is reached.

12. The method of claim 9, wherein the high-reliability class virtual topology is a subset of the low-reliability class virtual topology.

13. The method of claim 9, further comprising:
adding links from the low-reliability class virtual topology to the high-reliability class virtual topology in response to a number of links of the high-reliability class virtual topology falling below a threshold value.

14. The method of claim 9, further comprising:
modifying at least one of the low-reliability class virtual topology or the high-reliability class virtual topology in response to failure of one or more links of the physical topology.

15. The method of claim 9, wherein the data center network includes a predetermined portion of links that have low reliability.

16. One or more non-transitory computer-readable media storing computer-executable instructions that, when executed on one or more processors, configure a computer to perform acts comprising:
generating a low-reliability class virtual topology by selecting a first set of links of a physical topology of a data center network, wherein the selected links have low-reliability;
generating a high-reliability class virtual topology from the first set of links of the physical topology, wherein the high-reliability class virtual topology initially includes the first set of links of the physical topology;
determining loss rates of links from the first set of links of the physical topology;
determining a second set of links whose loss rates are higher than a threshold, wherein the threshold is associated with the high-reliability class virtual topology;
removing the second set of links from the high-reliability class virtual topology such that paths within the high-reliability class has a loss rate lower than the threshold; and
selecting a route for data transfer of an application, the route being in either the low-reliability class virtual topology or the high-reliability class virtual topology, the selecting based, at least in part, on a reliability demand of the application.

17. The non-transitory computer-readable media of claim 16, wherein the acts further comprise:
determining a path loss rate of the route for the data transfer of the application; and
determining a parity packet based on a number of packets sent as part of the data transfer of the application, wherein the number of packets is based on the determined path loss rate, and wherein the parity packet corrects bit errors in the number of packets.

18. The non-transitory computer-readable media of claim 16, wherein the acts further comprise:
adding links from the low-reliability class virtual topology to the high-reliability class virtual topology in response to a number of links of the high-reliability class virtual topology falling below a threshold value.

19. The non-transitory computer-readable media of claim 16, wherein each of the low-reliability class virtual topology and the high-reliability class virtual topology are subsets of the physical topology of the data center network.

20. The non-transitory computer-readable media of claim 16, wherein the acts further comprise modifying at least one of the low-reliability class virtual topology or the high-reliability class virtual topology in response to failure of one or more links of the physical topology.

* * * * *